(12) United States Patent
Chen (10) Patent No.: US 11,586,664 B2
(45) Date of Patent: Feb. 21, 2023

(54) IMAGE RETRIEVAL METHOD AND APPARATUS, AND ELECTRONIC DEVICE

(71) Applicant: HANGZHOU HIKVISION DIGITAL TECHNOLOGY CO., LTD., Hangzhou (CN)

(72) Inventor: Changhuai Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 442 days.

(21) Appl. No.: 16/632,775

(22) PCT Filed: Jul. 25, 2018

(86) PCT No.: PCT/CN2018/097008
§ 371 (c)(1),
(2) Date: Jan. 21, 2020

(87) PCT Pub. No.: WO2019/020049
PCT Pub. Date: Jan. 31, 2019

(65) Prior Publication Data
US 2020/0175062 A1    Jun. 4, 2020

(30) Foreign Application Priority Data
Jul. 28, 2017    (CN) .......................... 201710632446.X (51) Int. Cl.
*G06F 16/535* (2019.01)
*G06F 16/583* (2019.01)
(Continued)

(52) U.S. Cl.
CPC .......... *G06F 16/535* (2019.01); *G06F 16/54* (2019.01); *G06F 16/583* (2019.01); *G06K 9/6256* (2013.01); *G06V 10/25* (2022.01)

(58) Field of Classification Search
CPC ....... G06F 16/535; G06F 16/583; G06F 16/54
(Continued)

(56) References Cited

U.S. PATENT DOCUMENTS 10,810,252 B2 * 10/2020 Kerr .................... G06F 16/5838
2017/0097948 A1 * 4/2017 Kerr .................... G06F 16/532
(Continued)

FOREIGN PATENT DOCUMENTS

| AU | 2016210608 | 4/2017 |
| CN | 104517103 | 4/2015 |

(Continued)

OTHER PUBLICATIONS

Notification to Grant Patent Right for Invention issued in Corresponding Chinese Application No. 201710632446.X, dated Jul. 20, 2021 (English Translation provided).
(Continued)

*Primary Examiner* — Kimberly L Wilson
(74) *Attorney, Agent, or Firm* — Norton Rose Fulbright US LLP (57) ABSTRACT

Embodiments of the present application provide an image retrieval method, device, and electronic device. In the method, a query image is acquired; a target feature of the query image is determined based on a pre-trained deep neural network; wherein the deep neural network is obtained by training according to respective sample images and predetermined features, which can form the target feature, corresponding to the respective sample images; target features of a plurality of images to be retrieved is obtained; a similarity between the target feature of the query image and the target feature of each image to be retrieved is calculated; a retrieval image corresponding to the query image is determined from the plurality of images to be retrieved according to the calculated similarities.

15 Claims, 5 Drawing Sheets

(51) Int. Cl.
  *G06F 16/54* (2019.01)
  *G06K 9/62* (2022.01)
  *G06V 10/25* (2022.01)
(58) Field of Classification Search
  USPC .......................................................... 707/769
  See application file for complete search history.

(56) References Cited

U.S. PATENT DOCUMENTS

| | | | |
|---|---|---|---|
| 2017/0132497 | A1 | 5/2017 | Santos et al. |
| 2017/0206431 | A1 | 7/2017 | Sun et al. |
| 2018/0137642 | A1* | 5/2018 | Malisiewicz ........ G06N 3/0445 |
| 2020/0151577 | A1* | 5/2020 | Ogawa ................. G06Q 20/308 |

FOREIGN PATENT DOCUMENTS

| | | |
|---|---|---|
| CN | 106250812 | 12/2016 |
| CN | 106326288 | 1/2017 |
| CN | 106355188 | 1/2017 |
| CN | 106445939 | 2/2017 |
| CN | 106462626 | 2/2017 |
| CN | 106560809 | 4/2017 |
| CN | 106682092 | 5/2017 |
| CN | 106886573 | 6/2017 |
| CN | 106933867 | 7/2017 |
| TW | 201604821 | 2/2016 |

OTHER PUBLICATIONS

Yuan et al., "A Novel Deep Learning Based Method for Carotid Plaque Ultrasound Images Recognition" *China Medical Device Information* 2017, 9-11, 24.

Extended European Search Report issued in Corresponding European Application No. 18839135.3, dated Apr. 29, 2020.

Office Action issued in Corresponding Chinese Application No. 201710632446.X, dated Apr. 8, 2021 (English machine translation provided).

International Search Report and Written Opinion issued in corresponding PCT Application No. PCT/CN2018/097008, dated Oct. 8, 2018 (English translation of International Search Report provided).

Office Action issued in Corresponding Chinese Application No. 201110632446, dated Sep. 16, 2020 (English translation provided).

* cited by examiner

IMAGE RETRIEVAL METHOD AND APPARATUS, AND ELECTRONIC DEVICE

CROSS-REFERENCE TO RELATED APPLICATIONS

The present application is a national phase under 35 U.S.C. § 371 of International Application No. PCT/CN2018/097008, filed Jul. 25, 2018, which claims priority to Chinese patent application No. 201710632446.X filed with the China National Intellectual Property Administration on Jul. 28, 2017 and entitled "IMAGE RETRIEVAL METHOD AND APPARATUS, AND ELECTRONIC DEVICE", each of which are incorporated herein by reference in their entirety.

TECHNICAL FIELD

The present application relates to the technical field of image processing and pattern recognition, and in particular, to an image retrieval method, apparatus, and electronic device.

BACKGROUND

With the continuous development of storage technology, multimedia, compression technology, and network bandwidth, thousands of pictures are generated every day. In the field of image processing and pattern recognition, an important issue to be urgently addressed is how to quickly and accurately find desired images by a user from a huge library of images.

For retrieving desired images by a user, it needs to first analyze the user's requirements, and then find the images desired by the user from an image library. In the current image retrieval methods, a retrieval system receives a query image provided by a user, and then extracts a region of interest from the query image according to the user's instruction, where the region of interest represents a region that is recognizable and can reflect characteristics of the image, wherein the recognition capability represents the capacity to distinguish among different targets; then extracts the features of the region of interest and the features of a region of an image corresponding to the region of interest in the image library; and then compares the features of the region of interest of the query image with the corresponding region of the image in the database, and finally returns a retrieval result sorted according to similarities, and acquires the images that meet the requirements.

It can be seen that in current image retrieval methods, the region of interest extracted according to the user's instructions is too subjective, resulting in a large deviation in the determination of the region of interest, which ultimately makes the image retrieval accuracy low.

SUMMARY

The objective of the embodiments of the present application is to provide an image retrieval method, device, and electronic device, to improve the accuracy of image retrieval. The specific technical solutions are as follows:

In a first aspect, an embodiment of the present application provides an image retrieval method, including:

acquiring a query image; determining a target feature of the query image based on a pre-trained deep neural network; wherein the deep neural network is obtained by training according to sample images and predetermined features that are able to form the target feature and correspond to the sample images; obtaining target features of a plurality of images to be retrieved; calculating a similarity between the target feature of the query image and the target feature of each image to be retrieved; and determining a retrieval image corresponding to the query image from the plurality of images to be retrieved according to the calculated similarities.

Optionally, acquiring target features of a plurality of images to be retrieved includes: obtaining the target features of the plurality of images to be retrieved stored in a preset database; or determining the target features of the plurality of images to be retrieved based on the pre-trained deep neural network.

Optionally, the predetermined features are features of regions of interest, and the target feature is a feature aggregated with the features of the regions of interest; determining a target feature of the query image based on a pre-trained deep neural network includes:

inputting the query image into a pre-trained first deep neural network to obtain a target region of interest of the query image, wherein the first deep neural network is obtained by training according to the sample images and regions of interest corresponding to the sample images; inputting the target region of interest into a pre-trained second deep neural network to obtain a target region-of-interest feature of the target region of interest, wherein the second deep neural network is obtained by training according to the regions of interest and region-of-interest features of the regions of interest; and aggregating the target region-of-interest features into the target feature of the query image.

Optionally, the predetermined features are global features and the target feature is a global feature; determining a target feature of the query image based on a pre-trained deep neural network includes:

inputting the query image into a pre-trained third deep neural network to obtain a global feature of the query image, wherein the third deep neural network is obtained by training according to the sample images and global features corresponding to the sample images.

Optionally, determining a retrieval image corresponding to the query image from the plurality of images to be retrieved according to the calculated similarities includes:

sorting the calculated similarities, and determining the retrieval image corresponding to the query image from the plurality of images to be retrieved according to results of the sorting; or determining a target image to be retrieved among the plurality of images to be retrieved as the retrieval image corresponding to the query image, wherein the target image to be retrieved is an image to be retrieved with a similarity greater than a predetermined similarity threshold.

Optionally, after obtaining the target region of interest of the query image, the method further includes:

outputting position information of the target region of interest.

In a second aspect, an embodiment of the present application further provides an image retrieval apparatus, comprising:

an image acquiring module, configured to acquire a query image;

a first feature determining module, configured to determine a target feature of the query image based on a pre-trained deep neural network; wherein the deep neural network is obtained by training according to sample images and predetermined features that are able to form the target feature and correspond to the sample images;

a second feature determining module, configured to obtain target features of a plurality of images to be retrieved;

a calculating module, configured to calculate a similarity between the target feature of the query image and the target feature of each image to be retrieved.

a retrieval image determining module, configured to determine a retrieval image corresponding to the query image from the plurality of images to be retrieved according to the calculated similarities.

Optionally, the second feature determining module is specifically configured to obtain the target features of the plurality of images to be retrieved stored in a preset database; or determine the target features of the plurality of images to be retrieved based on the pre-trained deep neural network.

Optionally, the predetermined features are features of regions of interest, and the target feature is a feature aggregated with the features of the regions of interest;

the first feature determining module comprises:

a region of interest obtaining sub-module, configured to input the query image into a pre-trained first deep neural network to obtain a target region of interest of the query image, wherein the first deep neural network is obtained by training according to the sample images and regions of interest corresponding to the sample images; a region-of-interest feature determining sub-module, configured to input the target region of interest into a pre-trained second deep neural network to obtain a target region-of-interest feature of the target region of interest, wherein the second deep neural network is obtained by training according to the regions of interest and region-of-interest features of the regions of interest; and a first feature determining sub-module, configured to aggregate the target region-of-interest features into the target feature of the query image.

Optionally, the predetermined features are global features and the target feature is a global feature; the first feature determining module comprises:

a second feature determining sub-module, configured to input the query image into a pre-trained third deep neural network to obtain a global feature of the query image, wherein the third deep neural network is obtained by training according to the sample images and global features corresponding to the sample images.

Optionally, the retrieval image determining module is specifically configured to sort the calculated similarities, and determine the retrieval image corresponding to the query image from the plurality of images to be retrieved according to results of the sorting; or, determine a target image to be retrieved among the plurality of images to be retrieved as the retrieval image corresponding to the query image, wherein the target image to be retrieved is an image to be retrieved with a similarity greater than a predetermined similarity threshold.

Optionally, the image retrieval apparatus further comprises an output module, configured to output position information of the target region of interest after obtaining the target region of interest of the query image.

In a third aspect, an embodiment of the present application further provides an electronic device, comprising: a processor, a communication interface, a memory, and a communication bus, wherein the processor, the communication interface, and the memory communicate with each other via the communication bus;

the memory is configured to store a computer program.

the processor is configured for executing a program stored in the memory to perform the following operations:

acquiring a query image;

determining a target feature of the query image based on a pre-trained deep neural network; wherein the deep neural network is obtained by training according to sample images and predetermined features that are able to form the target feature and correspond to the sample images; obtaining target features of a plurality of images to be retrieved; calculating a similarity between the target feature of the query image and the target feature of each image to be retrieved; and determining a retrieval image corresponding to the query image from the plurality of images to be retrieved according to the calculated similarities.

Optionally, acquiring target features of a plurality of images to be retrieved comprises:

obtaining the target features of the plurality of images to be retrieved stored in a preset database; or determining the target features of the plurality of images to be retrieved based on the pre-trained deep neural network.

Optionally, the predetermined features are features of regions of interest, and the target feature is a feature aggregated with the features of the regions of interest; determining a target feature of the query image based on a pre-trained deep neural network includes: inputting the query image into a pre-trained first deep neural network to obtain a target region of interest of the query image, wherein the first deep neural network is obtained by training according to the sample images and regions of interest corresponding to the sample images; inputting the target region of interest into a pre-trained second deep neural network to obtain a target region-of-interest feature of the target region of interest, wherein the second deep neural network is obtained by training according to the regions of interest and region-of-interest features of the regions of interest; and aggregating the target region-of-interest features into the target feature of the query image.

Optionally, the predetermined features are global features and the target feature is a global feature; determining a target feature of the query image based on a pre-trained deep neural network includes: inputting the query image into a pre-trained third deep neural network to obtain a global feature of the query image, wherein the third deep neural network is obtained by training according to the sample images and global features corresponding to the sample images.

Optionally, determining a retrieval image corresponding to the query image from the plurality of images to be retrieved according to the calculated similarities includes: sorting the calculated similarities, and determining the retrieval image corresponding to the query image from the plurality of images to be retrieved according to results of the sorting; or determining a target image to be retrieved among the plurality of images to be retrieved as the retrieval image corresponding to the query image, wherein the target image to be retrieved is an image to be retrieved with a similarity greater than a predetermined similarity threshold.

Optionally, the processor is further configured to output position information of the target region of interest after obtaining the target region of interest of the query image.

In a fourth aspect, an embodiment of the present application further provides a storage medium with executable codes stored thereon, wherein the executable codes are executed to implement the image retrieval method of the first aspect.

In a fifth aspect, an embodiment of the present application further provides an application program, used to perform the steps of the image retrieval method of the first aspect when being executed.

The image retrieval method provided in the embodiment of the present application can determine a target feature of a query image based on a pre-trained deep neural network;

calculate a similarity between the target feature of the query image and the target feature of each image to be retrieved; and in turn determine a retrieval image corresponding to the query image from a plurality of images to be retrieved according to the calculated similarities. It can be seen that the image retrieval apparatus provided in the embodiment of the present application can determine the features reflecting the characteristics of the image accurately without extracting the features of the image according to the instruction of the user, that is, without the subjective participation of the user, thereby improving the accuracy of image retrieval. At the same time, based on the pre-trained deep neural network, the target feature of the query image is determined, the target feature is automatically located, and the user experience is improved. Of course, to implement any product or method of the present application, it is not necessary to achieve all the advantages described above at the same time.

DETAILED DESCRIPTION OF THE INVENTION

The present application will be further described in detail below with reference to the accompanying drawings. It is apparent that the described embodiments are only a part of the embodiments of the present application, and not all of them. All other embodiments obtained by a person of ordinary skill in the art based on the embodiments of the present application without any creative effort fall within the protection scope of the present application.

Figure 1:
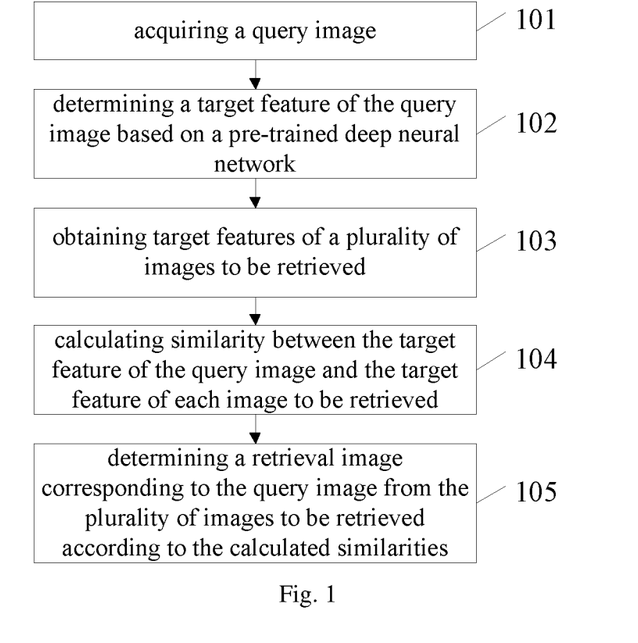
FIG. 1 is a flowchart of an image retrieval method according to an embodiment of the present application.

FIG. 1 is a flowchart of an image retrieval method according to an embodiment of the present application. Referring to FIG. 1, an image retrieval method according to an embodiment of the present application is described in detail. The method includes:

Step 101: acquiring a query image.

The image retrieval method according to the embodiment of the present application may be applied to an electronic device. The electronic device may include a desktop computer, a portable computer, a smart mobile terminal, and the like.

In the embodiment of the present application, the electronic device acquires a query image, that is, acquires a target image to be retrieved, for example, an image containing a cat face, and so on. In addition, the query image may be uploaded manually by a user or captured by the electronic device automatically, which are all appropriate.

Step 102: determining a target feature of the query image based on a pre-trained deep neural network, wherein the deep neural network is obtained by training according to sample images and predetermined features corresponding to the sample images, which can form the target feature.

In the embodiment of the present application, the image retrieval is achieved by comparing the target feature of the query image with features corresponding to images in an image library. Therefore, in the process of image retrieval, it is very important to determine the target feature of the query image.

In order to improve the accuracy of image retrieval, the electronic device can train a deep neural network in advance according to a certain number of sample images, such as 100, 500, 1,000, and the like, and predetermined features that can form the target feature and correspond to the sample images. The target feature of the query image can be determined based on the deep neural network.

Therefore, in the process of image retrieval, after acquires the query image, the electronic device can input the query image into the pre-trained deep neural network, and then determine the target feature of the query image based on the pre-trained deep neural network.

Since the target feature can be formed based on the predetermined features. In a specific implementation, the predetermined features required for training a deep neural network may be the same as the target feature. For example, the predetermined feature is a global feature, and the target feature is a global feature. In another specific implementation, the predetermined features required for training a deep neural network may be different from the target feature, but the target feature can be generated with the predetermined features. For example, the predetermined feature is a feature of a region of interest, and the target feature is a feature aggregated with features of the regions of interest. The so-called feature of a region of interest refers to an image feature corresponding to a region of interest that has a recognition capability and can reflect characteristics of the image.

In order to understand the technical solution and the layout clearly, a specific implementation for determining a target feature of a query image based on a pre-trained deep neural network is introduced in combination with specific embodiments.

Step 103: obtaining target features of a plurality of images to be retrieved.

In order to retrieve a desired image from a large number of images in the image library, it is required to determine features of images in the image library corresponding to the target features of the query image, that is, determining target features of a plurality of images to be retrieved in the image library. Specifically, pre-stored target features of a plurality of images to be retrieved can be directly obtained or can be determined in real time during the image retrieval process.

Optionally, in the embodiment of the present application, target features of a plurality of images to be retrieved that are stored in a preset database may be acquired directly. Specifically, the target features of the plurality of images to be retrieved are extracted in advance, and the target features are stored in a preset database. As a result, in the image retrieval process, corresponding target features can be obtained directly from the preset database.

It can be seen that the target features of the images to be retrieved are extracted in advance, and during the image retrieval process, the target features of the plurality of images to be retrieved stored in the preset database may be obtained directly. The target features of the images to be retrieved can be stored in advance to realize offline extraction of the target features of the images to be retrieved. It solves the problem of ultra-long delay in extracting target features of a plurality of images to be retrieved in real time, in order to meet the needs of real-time applications.

Alternatively, the target features of the plurality of images to be retrieved may also be determined online. In an optional implementation of the embodiment of the present application, the target features of a plurality of images to be retrieved may be determined based on a pre-trained deep neural network. Specifically, the process of determining the target features of a plurality of images to be retrieved based on a pre-trained deep neural network is similar to the process of determining the target feature of the query image based on the pre-trained deep neural network, and will not be repeated here.

Step 104: calculating a similarity between the target feature of the query image and the target feature of each image to be retrieved.

After the target features of the query image and the target features of a plurality of images to be retrieved are determined, the target features of the query image can be compared respectively with the target features of each of the images to be retrieved, and a retrieval image corresponding to the query image can be determined according to the comparison result of the target features.

The feature similarity measurement is an important aspect that affects the performance of image retrieval. Therefore, in the embodiment of the present application, after the target feature of the query image and the target features of a plurality of images to be retrieved are determined, the similarity between the target feature of the query image and the target feature of each image to be retrieved can be calculated respectively. Specifically, in an implementation, the target feature of the query image and the target feature of each image to be retrieved may be represented by feature vectors, and then the similarity between the feature vectors is calculated to obtain the similarity of the target feature of the query image and the target feature of each image to be retrieved, to which the present invention is not limited.

Step 105: determining a retrieval image corresponding to the query image from the plurality of images to be retrieved according to the calculated similarities.

The similarity between the target feature of the query image and the target feature of each image to be retrieved is calculated, and the retrieval image corresponding to the query image is determined from the plurality of images to be retrieved according to the similarity. For example, a retrieval image corresponding to the query image may be determined from the images to be retrieved according to the similarity in a descending order.

It should be noted that, according to the calculated similarities, there are a plurality of specific implementations for determining a retrieval image corresponding to the query image from the plurality of images to be retrieved.

Optionally, in an optional implementation of the embodiment of the present application, determining the retrieval image corresponding to the query image from the plurality of images to be retrieved according to the calculated similarities may include:

sorting the calculated similarities, and determining the retrieval image corresponding to the query image from the plurality of images to be retrieved according to results of the sorting;

Specifically, the calculated similarities are sorted from high to low or from low to high, and a preset number of images to be retrieved with the highest similarities are selected as retrieval images corresponding to the query image. For example, if the similarities are sorted from high to low, a preset number of images to be retrieved at the top are determined as the retrieval images corresponding to the query image; if the similarities are sorted from low to high, a preset number of images to be retrieved at the bottom are determined as the retrieved images corresponding to the query image. The preset number may be one, two, ten, or the like.

Optionally, in another optional implementation of the embodiment of the present application, determining the retrieval image corresponding to the query image from the plurality of images to be retrieved according to the calculated similarity may include:

determining a target image to be retrieved among the plurality of images to be retrieved as the retrieval image corresponding to the query image, wherein the target image to be retrieved is an image to be retrieved with a similarity greater than a predetermined similarity threshold.

Specifically, the similarity threshold is determined, and a preset number of images to be retrieved corresponding to similarities greater than the similarity threshold are selected as retrieval images corresponding to the query image. Specifically, the similarity threshold may be determined according to actual scenarios.

The image retrieval method provided in the embodiment of the present application determines a target feature of a query image based on a pre-trained deep neural network; calculates a similarity between the target feature of the query image and target feature of each image to be retrieved; and then determine a retrieval image corresponding to the query image from a plurality of images to be retrieved based on the calculated similarities. It can be seen that the image retrieval method provided by the embodiment of the present application can determine the features reflecting the characteristics of an image accurately, thereby improving the accuracy of the image retrieval.

It should be noted that during the image retrieval process, the user may choose to perform retrieval with a region of interest or global retrieval. Specifically, the image retrieval process may be implemented by comparing the feature of a region of interest of an image or the global feature of an image.

In the embodiment of the present application, the global feature of the query image may be determined directly and used as the target feature of the query image; or the features of the region of interest of the query image may be determined first, and then the features of the region of interest are aggregated into the target feature of the query image.

An image retrieval method provided by an embodiment of the present application is described below in combination with a specific embodiment.

In the specific embodiment, the predetermined features are the features of regions of interest, and the target feature is a feature aggregated with the features of the regions of interest.

At this time, the features of the region of interest of the query image can be extracted with two pre-trained deep neural networks, and then the features of the region of interest can be extracted.

Figure 2:
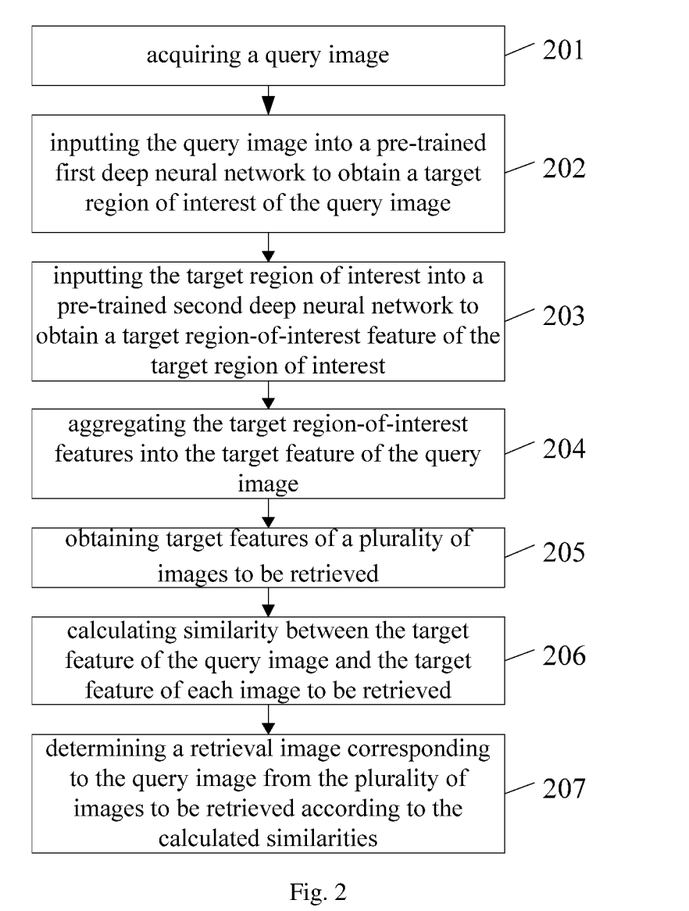
FIG. 2 is a flowchart of an image retrieval method according to an embodiment of the present application.

As shown in FIG. 2, an image retrieval method may include the following steps:

Step 201: acquiring a query image.

Step 202: inputting the query image into a pre-trained first deep neural network to obtain a target region of interest of the query image, wherein the first deep neural network is obtained by training according to respective sample images and regions of interest corresponding to the respective sample images.

The first deep neural network is trained in advance according to a certain number of sample images, such as 100, 500, 1000, and the regions of interest corresponding to the respective sample images. In the image retrieval process, the query image is input into the pre-trained first deep neural network to obtain the target region of interest of the query image.

Specifically, the query image is input into the pre-trained first deep neural network, and the first deep neural network performs operations on the query image to obtain a feature map with a downsampling scale with the same size as the query image or maintains a same aspect ratio. The value of each position in the feature map represents the recognition capability of the original position of the correspondingly input query image, thresholding and morphological operations are performed on the feature map to obtain a plurality of sub-regions with strong recognition capabilities, which are determined as regions of interest.

In addition, after the target region of interest of the query image is obtained, position information of the target region of interest can also be output. For example, the obtained position information of the target region of interest of the query image may be output to the user.

Step 203: inputting the target region of interest into a pre-trained second deep neural network to obtain a target region-of-interest feature of the target region of interest, wherein the second deep neural network is obtained by training according to respective regions of interest and region-of-interest features of the respective regions of interest.

Corresponding to the training process of the first deep neural network, the second deep neural network is trained in advance according to a certain number of sample images, such as 100, 500, 1000 and the like, and the region-of-interest features corresponding to the respective regions of interest.

The target region of interest of the query image obtained by the pre-trained first deep neural network is input into the pre-trained second deep neural network, and the target region-of-interest feature of the target region of interest can be obtained.

Specifically, a recognition capability score of a region of interest can be calculated according to the corresponding recognition capability in the region of interest, and then the recognition capability score and the region of interest are input into the pre-trained second deep neural network together with the query image. The pre-trained second deep neural network performs feature extraction according to the region of interest and its corresponding recognition capability to obtain the feature of each region of interest.

Step 204: aggregating the target region-of-interest features into the target feature of the query image.

In an actual image retrieval process, there may be more than one target region of interest obtained with the pre-trained first deep neural network. Correspondingly, there may be more than one target region-of-interest features, more than one type or of different sizes obtained with the pre-trained second deep neural network. Therefore, after the target region-of-interest features of the query image are extracted by pre-training the first deep neural network and the second deep neural network, different target region-of-interest features corresponding to a plurality of different target regions of interest features may be aggregated into the target feature of the query image. It should be noted that the aggregation may include determining a collection of a plurality of different target region-of-interest into the target feature, or adjusting a plurality of target region-of-interest features with different sizes of types into the target region-of-interest features with same size or type, and then combining these target region-of-interest features as the target feature of the query image.

Figure 3:
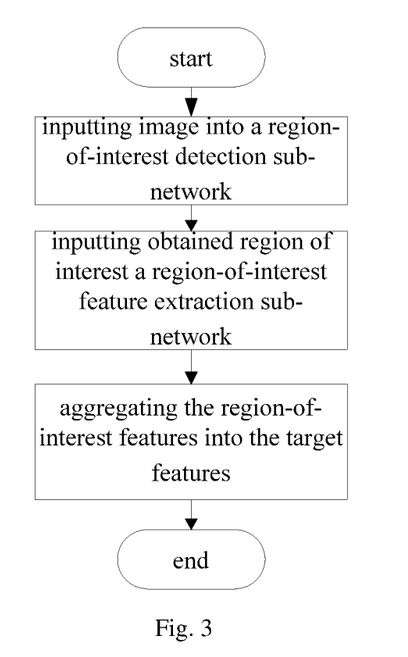
FIG. 3 is a flowchart of determining an image target feature with two deep neural networks according to an embodiment of the present application.

FIG. 3 is a flowchart of determining target features of an image with two networks according to an embodiment of the present application.

In a first step, an image is input into a pre-trained first deep neural network, that is, a region-of-interest detection sub-network shown in FIG. 3, to obtain a region of interest of the image.

In a second step, the obtained region of interest is input into a pre-trained second deep neural network, that is, a region-of-interest feature extraction sub-network shown in FIG. 3 to obtain a region-of-interest feature of the image.

In a third step, the region-of-interest features corresponding to all the regions of interest are aggregated to obtain the target features of the image.

Step 205: obtaining target features of a plurality of images to be retrieved.

Step 206: calculating a similarity between the target feature of the query image and the target feature of each image to be retrieved.

Step 207: determining a retrieval image corresponding to the query image from the plurality of images to be retrieved according to the calculated similarities.

In this specific embodiment, step 201 is the same as step 101 in the foregoing embodiment, and steps 205-207 are the same as step 103-step 105 in the foregoing embodiment, and details are not repeated herein.

In this embodiment, a target region of interest of a query image is obtained by using a pre-trained deep neural network, and then a target region-of-interest feature of the target region of interest are obtained by using another pre-trained deep neural network. The target region-of-interest features are aggregated into the target feature needed in the retrieval process. Two independent deep neural networks can be trained separately, which simplifies the complexity of training and further reduces the complexity of image retrieval. At the same time, the results of each deep neural network can also be output to the user to interact with the user.

An image retrieval method provided by an embodiment of the present application is described below in combination with another specific embodiment.

In this specific embodiment, the predetermined feature is a global feature, and the target feature is a global feature. At this time, the target feature of the query image can be obtained with a pre-trained deep neural network.

Figure 4:
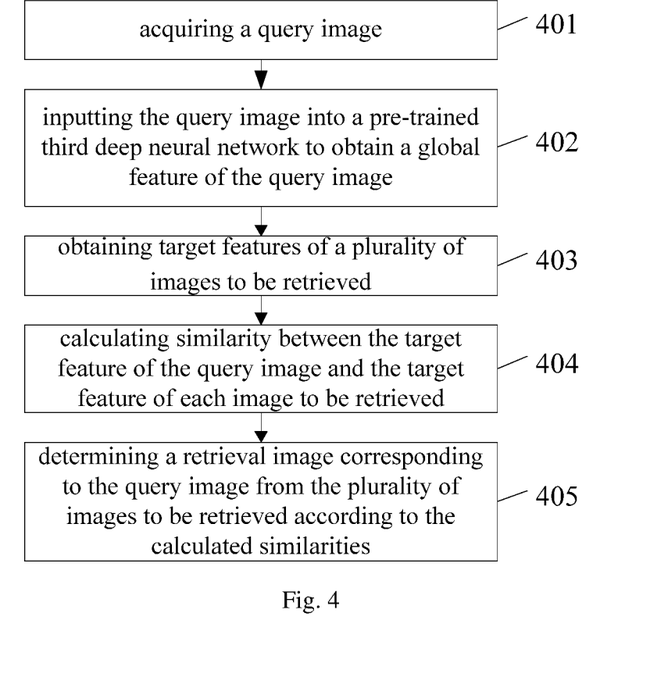
FIG. 4 is a flowchart of an image retrieval method according to an embodiment of the present application.

As shown in FIG. 4, an image retrieval method may include the following steps:

Step 401: acquiring a query image.

Step 402: inputting the query image into a pre-trained third deep neural network to obtain a global feature of the query image, wherein the third deep neural network is obtained by training according to respective sample images and global features corresponding to the respective sample images.

The query image is input into a pre-trained third deep neural network to obtain the global feature of the query image. The third deep neural network is obtained by training according to respective sample images and global features corresponding to the respective sample images.

Corresponding to the training process of the first deep neural network and the second deep neural network, the third depth neural network is obtained by training according to a certain number of sample images in advance, such as 100, 500, 1000, etc., and the global features corresponding to the respective sample images. In the image retrieval process, a query image is input into the pre-trained third deep neural network to obtain global feature of the query image, and the obtained global feature of the query image is used as target feature of the query image.

Specifically, the query image is input into the pre-trained third deep neural network, and the third deep neural network operates on the query image to obtain a feature map with a downsampling scale that is the same size as the query image or maintains the same aspect ratio. The value of each position in the feature map not only indicates the recognition capability of the corresponding position in the query image, but also the characteristic response of the corresponding query image. Then, the global feature of the query image is determined based on the feature map.

Figure 5:
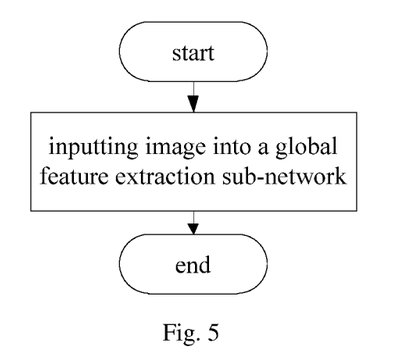
FIG. 5 is a flowchart of determining an image target feature with a deep neural network according to an embodiment of the present application.

FIG. 5 is a flowchart of determining a target feature of an image by using a deep neural network according to an embodiment of the present application. The image is input into a pre-trained deep neural network, for example, the global feature extraction sub-network shown in FIG. 5. The global feature extraction sub-network directly extracts the global feature of the image, and uses the global feature as the target feature of the image.

Step 403: obtaining target features of a plurality of images to be retrieved.

Step 404: calculating a similarity between the target feature of the query image and the target feature of each image to be retrieved.

Step 405: determining a retrieval image corresponding to the query image from the plurality of images to be retrieved according to the calculated similarities.

In this specific embodiment, step 401 is the same as step 101 in the foregoing embodiment, and steps 403-405 are the same as step 103-step 105 in the foregoing embodiment, and details are not repeated herein.

In this embodiment, the global feature of the query image is obtained with a pre-trained deep neural network, and the global feature is the target feature required in the retrieval process. Only one deep neural network needs to be trained, and then the target feature of the image can be obtained with the pre-trained deep neural network, which simplifies the training process and improves the efficiency of image retrieval.

As shown in the specific embodiments shown in FIG. 2 and FIG. 4, in the image retrieval method provided in the embodiment of the present application, the extraction of the region of interest of the image and the extraction of the image features are determined by a pre-trained deep neural network, which is an end-to-end overall solution similar to the response of the human visual system, and thus making the extracted image features more recognizable and have the capability of expressing, in turn ensuring the final image retrieval results.

Figure 6:
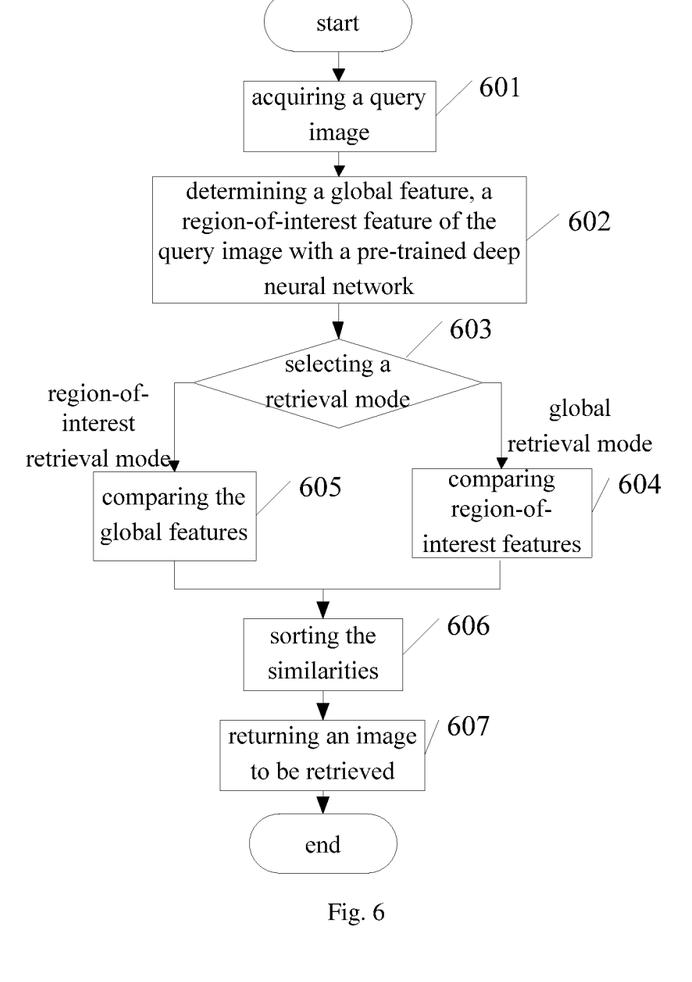
FIG. 6 is a flowchart of a specific process of image retrieval according to an embodiment of the present application.

FIG. 6 is a flowchart of a specific process of image retrieval in the embodiment of the present application, and a specific process of image retrieval in the embodiment of the present application is described in detail with reference to FIG. 6.

Step 601: acquiring a query image submitted by a user.

Step 602: extracting a region of interest of the query image with a pre-trained deep neural network, and then aggregating features of the region of interest or extracting a global feature of the image directly. In addition, the position information of the region of interest can also be returned to the user for selection.

Step 603, selecting a retrieval mode by the user.

Step 604, if a global retrieval mode is selected, that is, determining global features of a plurality of images to be retrieved directly with a pre-trained deep neural network, and then comparing the global feature of the query image with the global feature of each image to be retrieved.

Step 605, if a region-of-interest retrieval mode is selected, that is, selecting regions of interest of a plurality of images to be retrieved with a pre-trained deep neural network, and then extracting region-of-interest features of the regions of interest, and then comparing the region-of-interest feature of the query image with the region-of-interest feature of the region of interest for each image to be retrieved.

Step 606, if a global retrieval mode is selected, after the global features are compared to obtain a similarity between the global feature of the query image and the global feature of each image to be retrieved, and then determining the retrieval image from the plurality of images to be retrieved according to the similarity obtained by comparing the global features.

If the region-of-interest retrieval mode is selected, after the region-of-interest features are compared, the similarity between the region-of-interest feature of the query image and the region-of-interest feature of each image to be retrieved is obtained, and in turn, the retrieval image is determined from the plurality of images to be retrieved according to the similarity obtained by comparing the region-of-interest features.

Specifically, determining the retrieval image from the plurality of images to be retrieved according to the similarity obtained by comparing the global features or determining the retrieval image from the plurality of images to be retrieved according to the similarity obtained by comparing the region-of-interest features can include: soring the similarities, and determining a retrieval image from the plurality of images to be retrieved according to the result of the sorting or selecting a preset number of images to be retrieved corresponding to a similarity greater than a similarity threshold as the retrieval images corresponding to the query image.

Step 607, acquiring an image to be retrieved.

Figure 7:
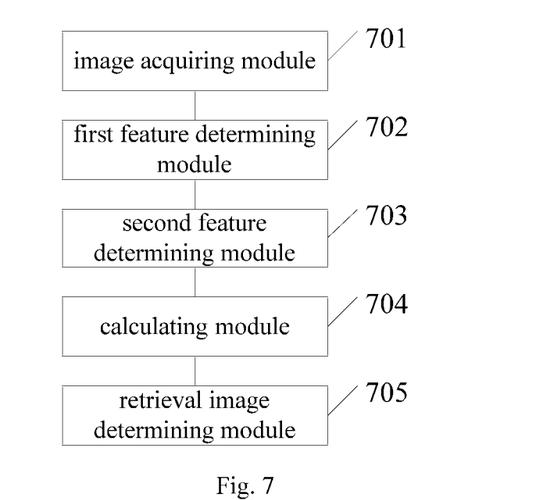
FIG. 7 is a schematic structural diagram of an image retrieval apparatus according to an embodiment of the present application.

FIG. 7 is a schematic structural diagram of an image retrieval apparatus provided by an embodiment of the present application. Referring to FIG. 7, an image retrieval apparatus provided by an embodiment of the present application is described in detail, including:

an image acquiring module 701, configured to acquire a query image;

a first feature determining module 702, configured to determine a target feature of the query image based on a pre-trained deep neural network; wherein the deep neural network is obtained by training according to sample images and predetermined features that are able to form the target feature and correspond to the sample images;

a second feature determining module 703, configured to obtain target features of a plurality of images to be retrieved;

a calculating module 704, configured to calculate a similarity between the target feature of the query image and the target feature of each image to be retrieved.

a retrieval image determining module 705, configured to determine a retrieval image corresponding to the query image from the plurality of images to be retrieved according to the calculated similarities.

The image retrieval apparatus provided in the embodiment of the present application can determine a target feature of a query image based on a pre-trained deep neural network; calculate a similarity between the target feature of the query image and the target feature of each image to be retrieved; and in turn determine a retrieval image corresponding to the query image from a plurality of images to be retrieved according to the calculated similarities. It can be seen that the image retrieval apparatus provided in the embodiment of the present application can determine the features reflecting the characteristics of the image accurately without extracting the features of the image according to the instruction of the user, that is, without the subjective participation of the user, thereby improving the accuracy of image retrieval. At the same time, based on the pre-trained deep neural network, the target feature of the query image is determined, the target feature is automatically located, and the user experience is improved.

Optionally, the second feature determining module 703 is specifically configured to obtain the target features of the plurality of images to be retrieved stored in a preset database; or determine the target features of the plurality of images to be retrieved based on the pre-trained deep neural network.

Optionally, the predetermined features are features of regions of interest, and the target feature is a feature aggregated with the features of the regions of interest; the first feature determining module 702 includes:

a region of interest obtaining sub-module, configured to input the query image into a pre-trained first deep neural network to obtain a target region of interest of the query image, wherein the first deep neural network is obtained by training according to the sample images and regions of interest corresponding to the sample images;

a region-of-interest feature determining sub-module, configured to input the target region of interest into a pre-trained second deep neural network to obtain a target region-of-interest feature of the target region of interest, wherein the second deep neural network is obtained by training according to the regions of interest and region-of-interest features of the regions of interest; and a first feature determining sub-module, configured to aggregate the target region-of-interest features into the target feature of the query image.

Optionally, the predetermined features are global features and the target feature is a global feature. The first feature determining module 702 includes a second feature determining sub-module, configured to input the query image into a pre-trained third deep neural network to obtain a global feature of the query image, wherein the third deep neural network is obtained by training according to the sample images and global features corresponding to the sample images.

Optionally, the retrieval image determining module 705 is specifically configured to sort the calculated similarities, and determine the retrieval image corresponding to the query image from the plurality of images to be retrieved according to results of the sorting; or, determine a target image to be retrieved among the plurality of images to be retrieved as the retrieval image corresponding to the query image, wherein the target image to be retrieved is an image to be retrieved with a similarity greater than a predetermined similarity threshold.

Optionally, the image retrieval apparatus provided in the embodiment of the present application further includes an output module, configured to output position information of the target region of interest after obtaining the target region of interest of the query image.

It should be noted that the image retrieval apparatus in the embodiment of the present application is a device to which the above-mentioned image retrieval method is applied, then all embodiments of the above-mentioned image retrieval method are applicable to the device, and all can achieve same or similar beneficial effects.

Figure 8:
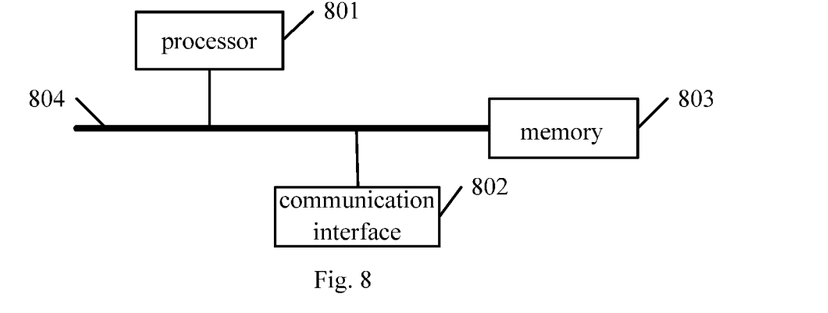
FIG. 8 is a schematic structural diagram of an electronic device according to an embodiment of the present application.

An embodiment of the present application further provides an electronic device, as shown in FIG. 8, including a processor 801, a communication interface 802, a memory 803, and a communication bus 804, wherein the processor 801, the communication interface 802, and the memory 803 communicate with each other via the communication bus 804.

The memory 803 is configured to store a computer program.

The processor 801 is configured to perform the following steps when executing a program stored in the memory 803:

acquiring a query image; determining a target feature of the query image based on a pre-trained deep neural network; wherein the deep neural network is obtained by training according to sample images and predetermined features that are able to form the target feature and correspond to the sample images; obtaining target features of a plurality of images to be retrieved; calculating a similarity between the target feature of the query image and the target feature of each image to be retrieved; and determining a retrieval image corresponding to the query image from the plurality of images to be retrieved according to the calculated similarities.

Optionally, the target features of the plurality of images to be retrieved stored in a preset database are obtained; or the target features of the plurality of images to be retrieved are determined based on the pre-trained deep neural network.

Optionally, the predetermined features are features of regions of interest, and the target feature is a feature aggregated with the features of the regions of interest; the query image is input into a pre-trained first deep neural network to obtain a target region of interest of the query image, wherein the first deep neural network is obtained by training according to the sample images and regions of interest corresponding to the sample images; the target region of interest is input into a pre-trained second deep neural network to obtain a target region-of-interest feature of the target region of interest, wherein the second deep neural network is obtained by training according to the regions of interest and region-of-interest features of the regions of interest; the target region-of-interest features are aggregated into the target feature of the query image.

Optionally, the predetermined features are global features and the target feature is a global feature; the query image is input into a pre-trained third deep neural network to obtain a global feature of the query image, wherein the third deep neural network is obtained by training according to the sample images and global features corresponding to the sample images.

Optionally, the calculated similarities are sorted, and the retrieval image corresponding to the query image is determined from the plurality of images to be retrieved according to results of the sorting; or, a target image to be retrieved among the plurality of images to be retrieved is determined as the retrieval image corresponding to the query image, wherein the target image to be retrieved is an image to be retrieved with a similarity greater than a predetermined similarity threshold.

Optionally, the processor is further configured to output position information of the target region of interest after obtaining the target region of interest of the query image.

The communication bus mentioned in the above electronic device may be a Peripheral Component Interconnect (PCI) bus or an Extended Industry Standard Architecture (EISA) bus. The communication bus can be divided into an address bus, a data bus, a control bus, and the like. For the convenience of representation, the bus is represented in the figures by using only a thick line, but it does not mean that there is only one bus or one type of bus.

The communication interface is used for communication between the aforementioned electronic device and other apparatus.

The memory may include Random Access Memory (RAM), and may also include Non-Volatile Memory (NVM), such as at least one disk memory. Optionally, the memory may also be at least one storage device located far from the foregoing processor.

The above-mentioned processor may be a general-purpose processor, including a central processing unit (CPU), a network processor (NP), or the like; it may also be a digital signal processor (DSP), an Application Specific Integrated Circuit (ASIC), a Field-Programmable Gate Array (FPGA), or other programmable logic devices, discrete gates or transistor logic devices, discrete hardware components.

The electronic device provided in the embodiment of the present application can determine a target feature of a query image based on a pre-trained deep neural network; calculate a similarity between the target feature of the query image and the target feature of each image to be retrieved; and in turn determine a retrieval image corresponding to the query image from a plurality of images to be retrieved according to the calculated similarities. It can be seen that the image retrieval apparatus provided in the embodiment of the present application can determine the features reflecting the characteristics of the image accurately without extracting the features of the image according to the instruction of the user, that is, without the subjective participation of the user, thereby improving the accuracy of image retrieval. At the same time, based on the pre-trained deep neural network, the target feature of the query image is determined, the target feature is automatically located, and the user experience is improved.

An embodiment of the present application further provides a storage medium for storing executable codes, and the executable codes are used to perform the following steps when being executed:

acquiring a query image; determining a target feature of the query image based on a pre-trained deep neural network; wherein the deep neural network is obtained by training according to sample images and predetermined features that are able to form the target feature and correspond to the sample images; obtaining target features of a plurality of images to be retrieved; calculating a similarity between the target feature of the query image and the target feature of each image to be retrieved; and determining a retrieval image corresponding to the query image from the plurality of images to be retrieved according to the calculated similarities.

Optionally, the target features of the plurality of images to be retrieved stored in a preset database are obtained; or the target features of the plurality of images to be retrieved are determined based on a pre-trained deep neural network.

Optionally, the predetermined features are features of regions of interest, and the target feature is a feature aggregated with the features of the regions of interest; the query image is input into a pre-trained first deep neural network to obtain a target region of interest of the query image, wherein the first deep neural network is obtained by training according to respective sample images and regions of interest corresponding to the respective sample images; the target region of interest is input into a pre-trained second deep neural network to obtain a target region-of-interest feature of the target region of interest, wherein the second deep neural network is obtained by training according to respective regions of interest and region-of-interest features of the respective regions of interest; the target region-of-interest features are aggregated into the target feature of the query image.

Optionally, the predetermined feature is a global feature and the target feature is a global feature; the query image is input into a pre-trained third deep neural network to obtain a global feature of the query image, wherein the third deep neural network is obtained by training according to respective sample images and global features corresponding to respective sample images.

Optionally, the calculated similarities are sorted, and the retrieval image corresponding to the query image is determined from the plurality of images to be retrieved according to results of the sorting; or, a target image to be retrieved among the plurality of images to be retrieved is determined as the retrieval image corresponding to the query image, wherein the target image to be retrieved is an image to be retrieved with a similarity greater than a predetermined similarity threshold.

Optionally, the processor is further configured to output position information of the target region of interest after obtaining the target region of interest of the query image.

The storage medium provided in the embodiment of the present application can determine a target feature of a query image based on a pre-trained deep neural network; calculate a similarity between the target feature of the query image and the target feature of each image to be retrieved; and in turn determine a retrieval image corresponding to the query image from a plurality of images to be retrieved according to the calculated similarities. It can be seen that the image retrieval apparatus provided in the embodiment of the present application can determine the features reflecting the characteristics of the image accurately without extracting the features of the image according to the instruction of the user, that is, without the subjective participation of the user, thereby improving the accuracy of image retrieval. At the same time, based on the pre-trained deep neural network, the target feature of the query image is determined, the target feature is automatically located, and the user experience is improved.

An embodiment of the present application further provides an application program for performing the following steps when being executed:

acquiring a query image; determining a target feature of the query image based on a pre-trained deep neural network; wherein the deep neural network is obtained by training according to sample images and predetermined features that are able to form the target feature and correspond to the sample images; obtaining target features of a plurality of images to be retrieved; calculating a similarity between the target feature of the query image and the target feature of each image to be retrieved; and determining a retrieval image corresponding to the query image from the plurality of images to be retrieved according to the calculated similarities.

Optionally, the target features of the plurality of images to be retrieved stored in a preset database are obtained; or the target features of the plurality of images to be retrieved are determined based on a pre-trained deep neural network.

Optionally, the predetermined features are features of regions of interest, and the target feature is a feature aggregated with the features of the regions of interest; the query image is input into a pre-trained first deep neural network to obtain a target region of interest of the query image, wherein the first deep neural network is obtained by training according to respective sample images and regions of interest corresponding to the respective sample images; the target region of interest is input into a pre-trained second deep neural network to obtain a target region-of-interest feature of the target region of interest, wherein the second deep neural network is obtained by training according to respective regions of interest and region-of-interest features of the respective regions of interest; the target region-of-interest features are aggregated into the target feature of the query image.

Optionally, the predetermined feature is a global feature and the target feature is a global feature; the query image is input into a pre-trained third deep neural network to obtain a global feature of the query image, wherein the third deep neural network is obtained by training according to respective sample images and global features corresponding to respective sample images.

Optionally, the calculated similarities are sorted, and the retrieval image corresponding to the query image is determined from the plurality of images to be retrieved according to results of the sorting; or, a target image to be retrieved among the plurality of images to be retrieved is determined as the retrieval image corresponding to the query image, wherein the target image to be retrieved is an image to be retrieved with a similarity greater than a predetermined similarity threshold.

Optionally, the processor is further configured to output position information of the target region of interest after obtaining the target region of interest of the query image.

The application program provided in the embodiment of the present application can determine a target feature of a query image based on a pre-trained deep neural network; calculate a similarity between the target feature of the query image and the target feature of each image to be retrieved; and in turn determine a retrieval image corresponding to the query image from a plurality of images to be retrieved according to the calculated similarities. It can be seen that the image retrieval apparatus provided in the embodiment of the present application can determine the features reflecting the characteristics of the image accurately without extracting the features of the image according to the instruction of the user, that is, without the subjective participation of the user, thereby improving the accuracy of image retrieval. At the same time, based on the pre-trained deep neural network, the target feature of the query image is determined, the target feature is automatically located, and the user experience is improved.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, as for embodiments of a device, electronic device, storage medium and application program, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

The invention claimed is:

1. An image retrieval method, comprising:
acquiring a query image;
determining a target feature of the query image based on a pre-trained deep neural network; wherein the deep neural network is obtained by training according to sample images and predetermined features that are able to form the target feature and correspond to the sample images;
obtaining target features of a plurality of images to be retrieved;
calculating a similarity between the target feature of the query image and the target feature of each image to be retrieved; and
determining a retrieval image corresponding to the query image from the plurality of images to be retrieved according to the calculated similarities;
wherein the predetermined features are features of regions of interest, and the target feature is a feature aggregated with the features of the regions of interest; and
wherein determining a target feature of the query image based on a pre-trained deep neural network comprises:
inputting the query image into a pre-trained first deep neural network to obtain a feature map, wherein the first deep neural network is obtained by training according to the sample images and regions of interest corresponding to the sample images, and a value of each position in the feature map represents recognition capability of an original position of the correspondingly input query image;
performing thresholding and morphological operations on the feature map to obtain a plurality of sub-regions with recognition capabilities;
determining the plurality of sub-regions as target regions of interest of the query image;
inputting the target region of interest into a pre-trained second deep neural network to obtain a target region-of-interest feature of the target region of interest, wherein the second deep neural network is obtained by training according to the regions of interest and region-of-interest features of the regions of interest; and aggregating the target region-of-interest features into the target feature of the query image.

2. The method according to claim 1, wherein obtaining target features of a plurality of images to be retrieved comprises:
obtaining the target features of the plurality of images to be retrieved stored in a preset database; or
determining the target features of the plurality of images to be retrieved based on the pre-trained deep neural network.

3. The method according to claim 1, wherein the predetermined features are global features and the target feature is a global feature; and
determining a target feature of the query image based on a pre-trained deep neural network comprises:
inputting the query image into a pre-trained third deep neural network to obtain a global feature of the query image, wherein the third deep neural network is obtained by training according to the sample images and global features corresponding to the sample images.

4. The method according to claim 1, wherein determining a retrieval image corresponding to the query image from the plurality of images to be retrieved according to the calculated similarities comprises:
sorting the calculated similarities, and determining the retrieval image corresponding to the query image from the plurality of images to be retrieved according to results of the sorting; or
determining a target image to be retrieved among the plurality of images to be retrieved as the retrieval image corresponding to the query image, wherein the target image to be retrieved is an image to be retrieved with a similarity greater than a predetermined similarity threshold.

5. The method according to claim 1, wherein, after obtaining the target region of interest of the query image, the method further comprises:
outputting position information of the target region of interest.

6. An electronic device, comprising: a processor, communication interfaces, a memory, and a communication bus, wherein the processor, the communication interfaces, and the memory communicate with each other via the communication bus;
the memory is configured to store a computer program;
the processor is configured for executing a program stored in the memory to perform the following operations:
acquiring a query image;
determining a target feature of the query image based on a pre-trained deep neural network; wherein the deep neural network is obtained by training according to sample images and predetermined features that are able to form the target feature and correspond to the sample images;
obtaining target features of a plurality of images to be retrieved;
calculating a similarity between the target feature of the query image and the target feature of each image to be retrieved; and
determining a retrieval image corresponding to the query image from the plurality of images to be retrieved according to the calculated similarities;
wherein the predetermined features are features of regions of interest, and the target feature is a feature aggregated with the features of the regions of interest; and wherein determining a target feature of the query image based on a pre-trained deep neural network comprises:
inputting the query image into a pre-trained first deep neural network to obtain a feature map, wherein the first deep neural network is obtained by training according to the sample images and regions of interest corresponding to the sample images, and a value of each position in the feature map represents recognition capability of an original position of the correspondingly input query image;
performing thresholding and morphological operations on the feature map to obtain a plurality of sub-regions with recognition capabilities;
determining the plurality of sub-regions as target regions of interest of the query image;
inputting the target region of interest into a pre-trained second deep neural network to obtain a target region-of-interest feature of the target region of interest, wherein the second deep neural network is obtained by training according to the regions of interest and region-of-interest features of the regions of interest; and
aggregating the target region-of-interest features into the target feature of the query image.

7. The electronic device according to claim 6, wherein, obtaining target features of a plurality of images to be retrieved comprises:
obtaining the target features of the plurality of images to be retrieved stored in a preset database; or
determining the target features of the plurality of images to be retrieved based on the pre-trained deep neural network.

8. The electronic device according to claim 6, wherein the predetermined features are global features and the target feature is a global feature; and
determining a target feature of the query image based on a pre-trained deep neural network comprises:
inputting the query image into a pre-trained third deep neural network to obtain a global feature of the query image, wherein the third deep neural network is obtained by training according to the sample images and global features corresponding to the sample images.

9. The electronic device according to claim 6, wherein determining a retrieval image corresponding to the query image from the plurality of images to be retrieved according to the calculated similarities comprises:
sorting the calculated similarities, and determining the retrieval image corresponding to the query image from the plurality of images to be retrieved according to results of the sorting; or
determining a target image to be retrieved among the plurality of images to be retrieved as the retrieval image corresponding to the query image, wherein the target image to be retrieved is an image to be retrieved with a similarity greater than a predetermined similarity threshold.

10. The electronic device according to claim 6, wherein the processor is further configured to output position information of the target region of interest after obtaining the target region of interest of the query image.

11. A non-transitory computer readable storage medium with executable codes stored thereon, wherein the executable codes are executed to implement an image retrieval method, wherein the image retrieval method, comprises:

acquiring a query image;
determining a target feature of the query image based on a pre-trained deep neural network; wherein the deep neural network is obtained by training according to sample images and predetermined features that are able to form the target feature and correspond to the sample images;
obtaining target features of a plurality of images to be retrieved;
calculating a similarity between the target feature of the query image and the target feature of each image to be retrieved; and
determining a retrieval image corresponding to the query image from the plurality of images to be retrieved according to the calculated similarities;
wherein the predetermined features are features of regions of interest, and the target feature is a feature aggregated with the features of the regions of interest; and
wherein determining a target feature of the query image based on a pre-trained deep neural network comprises:
inputting the query image into a pre-trained first deep neural network to obtain a feature map, wherein the first deep neural network is obtained by training according to the sample images and regions of interest corresponding to the sample images, and a value of each position in the feature map represents recognition capability of an original position of the correspondingly input query image;
performing thresholding and morphological operations on the feature map to obtain a plurality of sub-regions with recognition capabilities;
determining the plurality of sub-regions as target regions of interest of the query image;
inputting the target region of interest into a pre-trained second deep neural network to obtain a target region-of-interest feature of the target region of interest, wherein the second deep neural network is obtained by training according to the regions of interest and region-of-interest features of the regions of interest; and
aggregating the target region-of-interest features into the target feature of the query image.

12. The non-transitory computer readable storage medium according to claim 11, wherein obtaining target features of a plurality of images to be retrieved comprises:
obtaining the target features of the plurality of images to be retrieved stored in a preset database; or
determining the target features of the plurality of images to be retrieved based on the pre-trained deep neural network.

13. The non-transitory computer readable storage medium according to claim 11, wherein the predetermined features are global features and the target feature is a global feature; and
determining a target feature of the query image based on a pre-trained deep neural network comprises:
inputting the query image into a pre-trained third deep neural network to obtain a global feature of the query image, wherein the third deep neural network is obtained by training according to the sample images and global features corresponding to the sample images.

14. The non-transitory computer readable storage medium according to claim 11, wherein determining a retrieval image corresponding to the query image from the plurality of images to be retrieved according to the calculated similarities comprises:
sorting the calculated similarities, and determining the retrieval image corresponding to the query image from the plurality of images to be retrieved according to results of the sorting; or
determining a target image to be retrieved among the plurality of images to be retrieved as the retrieval image corresponding to the query image, wherein the target image to be retrieved is an image to be retrieved with a similarity greater than a predetermined similarity threshold.

15. The non-transitory computer readable storage medium according to claim 11, wherein, after obtaining the target region of interest of the query image, the method further comprises:
outputting position information of the target region of interest.

* * * * *